(12) United States Patent  
Casey et al.

(10) Patent No.: US 9,036,295 B1  
(45) Date of Patent: May 19, 2015

(54) INFORMATION STORAGE DEVICE WITH A DAMPING INSERT SHEET BETWEEN A HOUSING BAY AND A DISK DRIVE

(71) Applicant: Western Digital Technologies, Inc., Irvine, CA (US)

(72) Inventors: Shawn E. Casey, San Jose, CA (US); Jifang Tian, Fremont, CA (US); Tegan Campbell, Dana Point, CA (US); Hongqi Li, Redwood City, CA (US); William Flynn, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/225,376

(22) Filed: Mar. 25, 2014

Related U.S. Application Data

(62) Division of application No. 13/331,889, filed on Dec. 20, 2011, now Pat. No. 8,705,201.

(51) Int. Cl.
*G11B 33/04* (2006.01)
*G11B 33/08* (2006.01)

(52) U.S. Cl.
CPC ...................................... *G11B 33/08* (2013.01)

(58) Field of Classification Search
CPC ........................................................ G11B 33/04
USPC .................... 360/97.12, 97.19, 99.21, 99.22; 29/592.1, 603, 603.03, 925
See application file for complete search history.

(56) References Cited

U.S. PATENT DOCUMENTS

| | | |
|---|---|---|
| 4,713,714 A | 12/1987 | Gatti et al. |
| 4,831,476 A | 5/1989 | Branc et al. |
| 5,004,207 A | 4/1991 | Ishikawa et al. |
| 5,041,924 A | 8/1991 | Blackborow et al. |
| 5,081,551 A | 1/1992 | Aruga |
| 5,124,855 A | 6/1992 | Dew et al. |
| 5,216,582 A | 6/1993 | Russell et al. |
| 5,223,996 A | 6/1993 | Read et al. |
| 5,235,482 A | 8/1993 | Schmitz |

(Continued)

FOREIGN PATENT DOCUMENTS

EP 355534 A2 8/1989

OTHER PUBLICATIONS

Peter A. Masterson, "Isolation Techniques for 2.5-Inch Hard Disk Drives", https://www.earsc.com, 4 pages.

(Continued)

*Primary Examiner* — Brian Miller
*Assistant Examiner* — Carlos E Garcia

(57) ABSTRACT

A novel information storage device is disclosed and claimed. The information storage device includes a device housing with a generally rectangular bay to accommodate a disk drive. The generally rectangular bay includes a base portion and a plurality of side portions. The information storage device further includes a damping insert sheet disposed between the disk drive and the base portion. The damping insert sheet has a plurality of elastomeric cushions, for example with a cushion thickness in the range 0.5 mm to 10 mm, and a spanning sheet, for example having a sheet thickness in the range 0.02 mm to 0.35 mm. Each of the plurality of elastomeric cushions is attached to the spanning sheet. Each of the plurality of elastomeric cushions contacts and is compressed between the generally rectangular bay and the disk drive.

18 Claims, 4 Drawing Sheets

(56) References Cited

U.S. PATENT DOCUMENTS

| | | |
|---|---|---|
| 5,349,486 A | 9/1994 | Sugimoto et al. |
| 5,463,527 A | 10/1995 | Hager et al. |
| 5,535,092 A | 7/1996 | Bang |
| 5,654,875 A | 8/1997 | Lawson |
| 5,694,267 A | 12/1997 | Morehouse et al. |
| 5,726,834 A | 3/1998 | Eckberg et al. |
| 5,757,617 A | 5/1998 | Sherry |
| 5,777,821 A | 7/1998 | Pottebaum |
| 5,949,619 A | 9/1999 | Eckberg et al. |
| 5,958,212 A * | 9/1999 | Yamamura et al. ............ 205/723 |
| 6,046,889 A | 4/2000 | Berding et al. |
| 6,052,890 A | 4/2000 | Malagrino, Jr. et al. |
| 6,061,206 A | 5/2000 | Foisy et al. |
| 6,101,876 A | 8/2000 | Brooks et al. |
| 6,125,097 A | 9/2000 | Wu |
| 6,130,817 A | 10/2000 | Flotho et al. |
| 6,147,831 A | 11/2000 | Kennedy et al. |
| 6,151,189 A | 11/2000 | Brooks |
| 6,151,197 A | 11/2000 | Larson et al. |
| 6,154,360 A | 11/2000 | Kaczeus, Sr. et al. |
| 6,166,901 A | 12/2000 | Gamble et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,249,432 B1 | 6/2001 | Gamble et al. |
| 6,275,352 B1 | 8/2001 | Tadepalli et al. |
| 6,281,433 B1 * | 8/2001 | Decker et al. ................. 174/394 |
| 6,285,545 B1 | 9/2001 | Lopez |
| 6,288,866 B1 | 9/2001 | Butler et al. |
| 6,292,333 B1 | 9/2001 | Blumentritt et al. |
| 6,292,359 B1 | 9/2001 | Boe |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,487,039 B1 | 11/2002 | Bernett |
| 6,496,362 B2 | 12/2002 | Osterhout et al. |
| 6,498,722 B1 * | 12/2002 | Stolz et al. ............... 361/679.36 |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,545,865 B2 | 4/2003 | Zamora et al. |
| 6,549,381 B1 | 4/2003 | Watson |
| 6,560,065 B1 | 5/2003 | Yang et al. |
| 6,567,265 B1 | 5/2003 | Yamamura et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,618,246 B2 * | 9/2003 | Sullivan et al. .......... 361/679.46 |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,714,405 B2 | 3/2004 | Jitsukawa |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,751,092 B1 | 6/2004 | Ohnishi et al. |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,873,524 B2 | 3/2005 | Kaczeus, Sr. et al. |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 * | 10/2005 | Ojeda et al. ................. 360/97.19 |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| D512,422 S | 12/2005 | Sato et al. |
| 6,972,924 B1 | 12/2005 | Chen et al. |

(56) References Cited

U.S. PATENT DOCUMENTS

| | | |
|---|---|---|
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,106,582 B2 | 9/2006 | Albrecht et al. |
| 7,106,583 B2 | 9/2006 | Koh et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,187,543 B2 | 3/2007 | Zimlin |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,506 B2 | 5/2007 | Albrecht et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,227,761 B2 | 6/2007 | Estes et al. |
| 7,239,475 B1 | 7/2007 | Lin et al. |
| 7,251,131 B2 | 7/2007 | Shah et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,312,982 B2 | 12/2007 | Bruner et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,922 B2 | 5/2008 | Chen et al. |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,450,375 B2 | 11/2008 | Xu |
| 7,471,509 B1 | 12/2008 | Oliver |
| 7,477,488 B1 | 1/2009 | Zhang et al. |
| 7,477,489 B1 | 1/2009 | Chen et al. |
| 7,480,136 B2 | 1/2009 | Lalouette |
| 7,483,238 B2 | 1/2009 | Xu et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,561,375 B2 | 7/2009 | Kim et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,667,925 B2 | 2/2010 | Kim et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,701,705 B1 | 4/2010 | Szeremeta |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,817,373 B2 | 10/2010 | Choi et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |

(56) References Cited

U.S. PATENT DOCUMENTS

| | | |
|---|---|---|
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,462,460 B1 | 6/2013 | Szeremeta et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,658 B1 | 10/2013 | Szeremeta |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 2003/0174464 A1 | 9/2003 | Funawatari et al. |
| 2004/0032711 A1 | 2/2004 | Kaczeus, Sr. et al. |
| 2004/0190193 A1 | 9/2004 | Kuwajima |
| 2004/0255313 A1 | 12/2004 | Kaczeus, Sr. et al. |
| 2005/0088778 A1 | 4/2005 | Chen et al. |
| 2005/0180045 A1 | 8/2005 | Tsuda et al. |
| 2005/0185326 A1 | 8/2005 | Bruner et al. |
| 2005/0275966 A1 | 12/2005 | Janik et al. |
| 2006/0001992 A1 | 1/2006 | Friedrichs |
| 2006/0002076 A1 | 1/2006 | Albrecht et al. |
| 2006/0158775 A1 | 7/2006 | Sega et al. |
| 2007/0025014 A1 | 2/2007 | Kim |
| 2007/0076327 A1 | 4/2007 | Yang et al. |
| 2007/0133121 A1 | 6/2007 | Xu et al. |
| 2007/0133122 A1 | 6/2007 | Kim et al. |
| 2010/0290154 A1 | 11/2010 | Kim et al. |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

OTHER PUBLICATIONS

Seagate "Disc Drive Acoustics", Oct. 2001,7 pages.

Shawn Casey, "Hard Drive Mounting in Notebook Computer Systems", 2579-771615-A00-P2, Feb. 2011, 29 pages, Western Digital White Paper available at www.wdc.com.

Interview Summary dated Jul. 16, 2013, from U.S. Patent No. 8,705,201, 3 pages.

Notice of Allowance dated Sep. 13, 2013, from U.S. Patent No. 8,705,201, 18 pages.

Notice of Allowance dated Nov. 27, 2013, from U.S. Patent No. 8,705,201, 19 pages.

* cited by examiner

INFORMATION STORAGE DEVICE WITH A DAMPING INSERT SHEET BETWEEN A HOUSING BAY AND A DISK DRIVE

CROSS REFERENCE TO RELATED APPLICATION(S)

This application is a divisional of co-pending application Ser. No. 13/331,889 filed on Dec. 20, 2011, which is hereby incorporated by reference.

BACKGROUND

Information storage devices include computer systems and other consumer electronics products that can retrieve and/or store data. An information storage device may incorporate a magnetic hard disk drive. Magnetic hard disk drives are sensitive to their external environment, including mechanical shocks and vibrations, externally applied forces and electromagnetic fields, contamination, changes in temperature and/or humidity, etc. Therefore, an information storage device's housing and mounting system for an incorporated hard disk drive may affect overall device performance, reliability, and lifetime.

Disk drives may be housed within the system for which they retrieve and/or store data. For example, so-called "internal" disk drives are housed within a host computer system for which they store data, and therefore internal disk drives may take advantage of the host computer system for electrical power, electromagnetic shielding, convective and/or conductive cooling, and some degree of isolation from external mechanical shocks, and some attenuation of vibration and acoustic transmission.

Other information storage devices are external to another system for which they retrieve and/or store data. For example, a so-called "external" hard disk drive device includes a disk drive within a dedicated housing which may provide electromagnetic shielding, active or passive cooling, and some degree of isolation from external mechanical shocks, and some attenuation of vibration and acoustic transmission.

The mounting systems and housings for disk drives in modern information storage devices must often meet challenging space and cost requirements. Accordingly, there is an ongoing need in the art for improved disk drive mounting systems and housings in information storage devices.

DETAILED DESCRIPTION OF EXEMPLARY EMBODIMENTS

Figure 1:
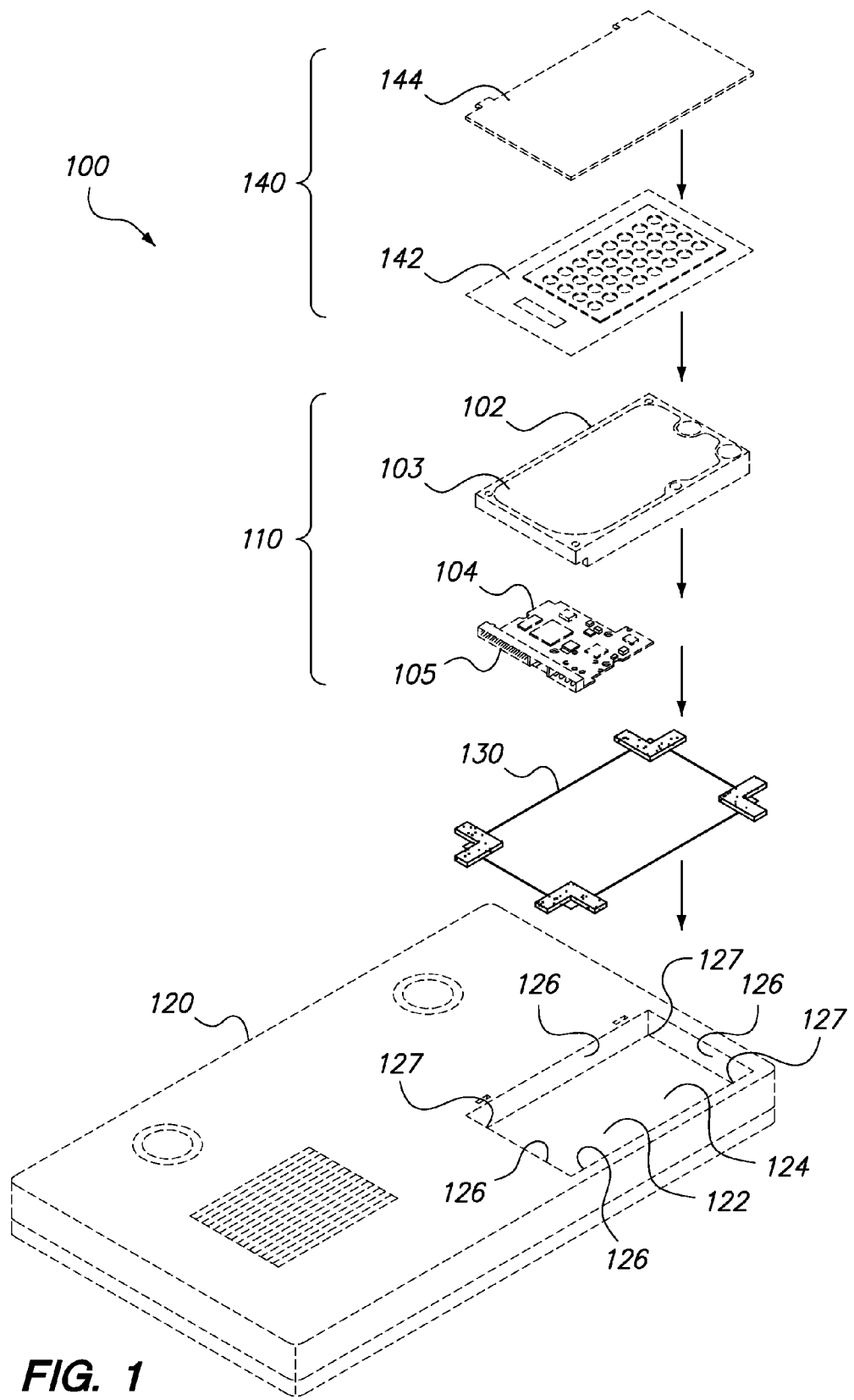
FIG. 1 is a bottom perspective exploded view of an information storage device according to an embodiment of the present invention.

FIG. 1 is a bottom perspective exploded view of an information storage device 100 according to an embodiment of the present invention. The information storage device 100 includes a disk drive 110 that has a head disk assembly (HDA) 102 and a printed circuit board assembly (PCBA) 104. The information storage device 100 also includes a device housing 120 that includes a generally rectangular bay 122 to accommodate the disk drive 110. The generally rectangular bay 122 includes a base portion 124 and a plurality of side portions 126. The base portion 124 may be an upper portion of a downward facing bay 122 in a laptop computer, where the bay is accessed from underneath the laptop, as shown in FIG. 1, for example. However, base portion 124 may alternatively be a bottom portion of an upward facing bay 122, for example where the bay 122 is accessed by lifting off all or a portion of the keyboard.

The information storage device 100 of FIG. 1 also includes a bay cover 140 that encloses the disk drive 110 within the generally rectangular bay 122, by attachment of the bay cover 140 to the device housing 120 of the information storage device 100. The bay cover 140 may optionally include an electrically conductive cover component 142 for electromagnetic noise shielding, and an aesthetic cover component 144 that may comprise a material that matches or enhances the general exterior appearance of the device housing 120 of the information storage device 100. For example, the aesthetic cover component 144 may be a portion of the bottom face of a laptop computer, or may alternatively be all or a portion of the keyboard of a laptop computer.

Figure 2:
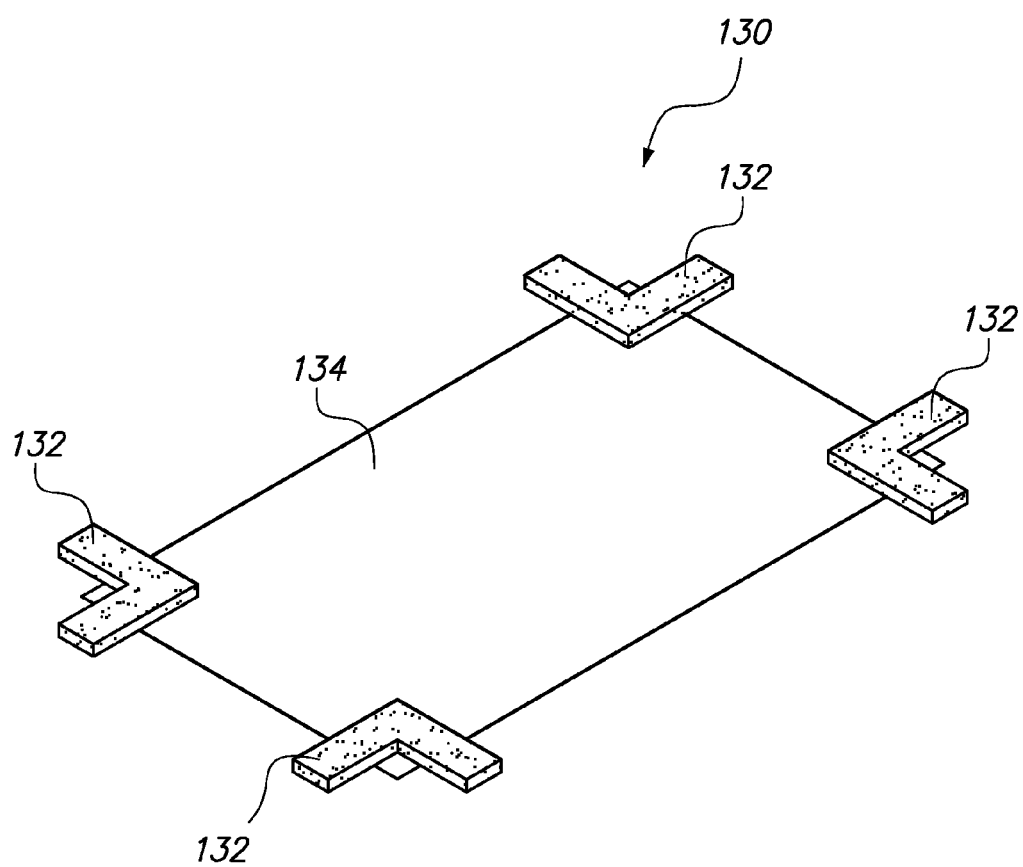
FIG. 2 depicts a damping insert sheet according to an embodiment of the present invention.

The information storage device 100 of FIG. 1 also includes a damping insert sheet 130 that is disposed between the disk drive 110 and the base portion 124 of the generally rectangular bay 122 of the device housing 120. FIG. 2 shows the damping insert sheet 130 in greater detail. Now referring to FIGS. 1 and 2, the damping insert sheet 130 may include a plurality of elastomeric cushions 132, and a spanning sheet 134. Each of the plurality of elastomeric cushions 132 is attached to the spanning sheet 134 and is thicker than the spanning sheet 134. For example, in certain embodiments, the plurality of elastomeric cushions 132 may have a cushion thickness in the range 0.5 mm to 10 mm, and the spanning sheet 134 may have a sheet thickness in the range 0.02 mm to 0.35 mm. Such dimensional ranges may enhance the ability of the damping insert sheet 130 to reduce the transmission of mechanical shocks and vibrations between the disk drive 110 and the device housing 120.

In the embodiment of FIG. 2, the spanning sheet may comprise a polymer material (e.g. polyester) that is optionally doped with a conventional electrically dissipative dopant, or optionally coated with a conventional electrically dissipative coating. The plurality of elastomeric cushions 132 optionally may be fabricated from a viscoelastic material, such as polyurethane foam, rubber, silicon rubber, EPDM rubber (ethylene propylene terpolymer), or butyl rubber (isombutylene-isoprene copolymer), or the like. The plurality of elastomeric cushions 132 optionally may be doped with an electrically dissipative dopant, or optionally coated with an electrically dissipative coating.

Figure 3:
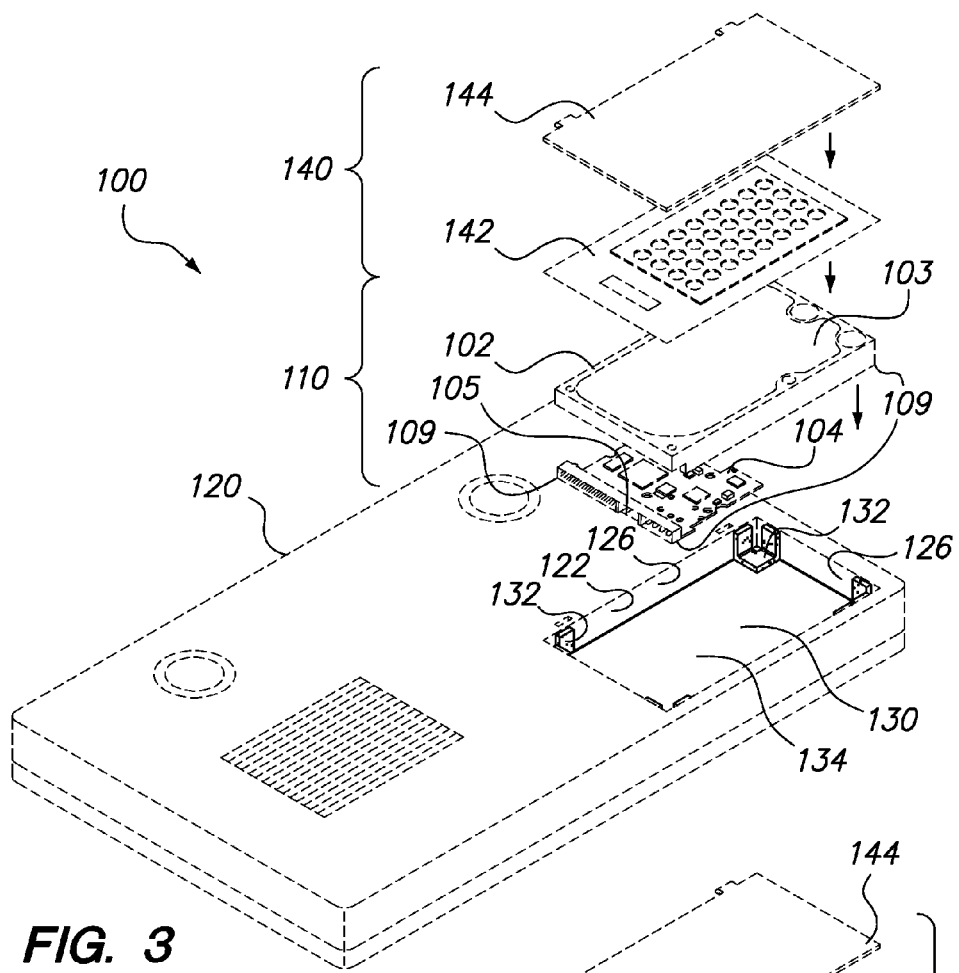
FIG. 3 is a bottom perspective exploded view of the information storage of FIG. 1, except with the damping insert sheet shown in its assembled position.
Figure 4:
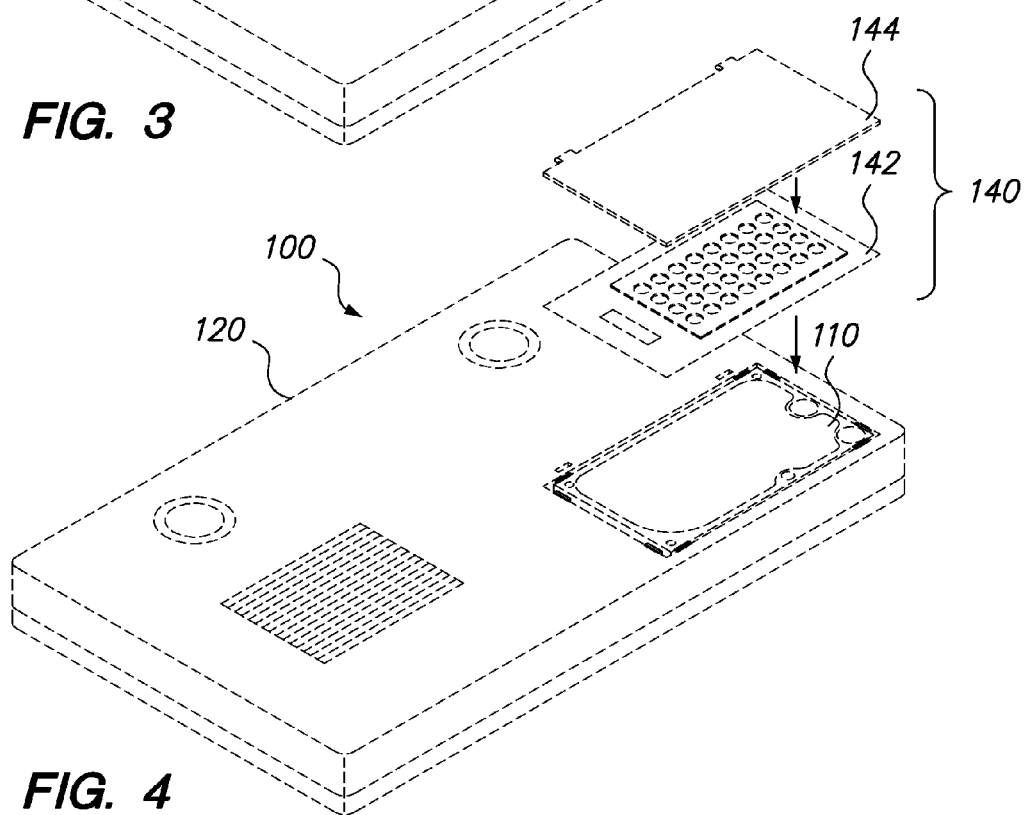
FIG. 4 is a bottom perspective exploded view of the information storage of FIG. 1, except with the damping insert sheet and disk drive shown in their assembled positions.

FIG. 3 is a bottom perspective exploded view of the information storage device 100 of FIG. 1, except with the damping insert sheet 130 shown in its assembled position. FIG. 4 is a bottom perspective exploded view of the information storage device 100 of FIG. 1, except with the damping insert sheet 130 and the disk drive 110 shown in their assembled positions. Now referring additionally to FIGS. 3 and 4, the HDA 102 includes a disk drive cover 103 that does not face the disk drive PCBA 104 after the PCBA 104 is attached to the HDA 102 during assembly. The disk drive PCBA 104 includes an electrical connector 105, and when the disk drive 110 is placed into the generally rectangular bay 122 of the device housing 120, the electrical connector 105 is attached to a mating electrical connector of the information storage device 100.

In the embodiment of FIGS. 1-4, it can be seen that each of the plurality of elastomeric cushions 132 contacts and is compressed between the generally rectangular bay 122 and the disk drive 110 after assembly. Specifically, in this embodiment the damping insert sheet 130 is disposed between the disk drive PCBA 104, and the base portion 124 of the generally rectangular bay 122 of the device housing 120, with at least one of the plurality of elastomeric cushions 132 contacting the disk drive PCBA 104. In this embodiment, the disk drive cover 103 is adjacent and facing the electrically conductive cover component 142 of the bay cover 140, after assembly.

In the embodiment of FIGS. 1-4, the disk drive 110 defines a plurality of external disk drive corners 109. Preferably but not necessarily, the plurality of elastomeric cushions 132 may contact and be compressed between the generally rectangular bay 122 and the disk drive 110 adjacent one or more of the external disk drive corners 109. Also, preferably but not necessarily, the plurality of side portions 126 of the generally rectangular bay 122 meet to define a plurality of internal bay corners 127 adjacent the base portion 124, and each of the plurality of elastomeric cushions 132 contacts and is compressed between the generally rectangular bay 122 and the disk drive 110 adjacent a respective one of the plurality of internal bay corners 127. Such positioning of the plurality of elastomeric cushions 132 may enhance protection of the disk drive 110 from certain risks associated with mechanical shocks externally applied to the information storage device 100.

Figure 5:
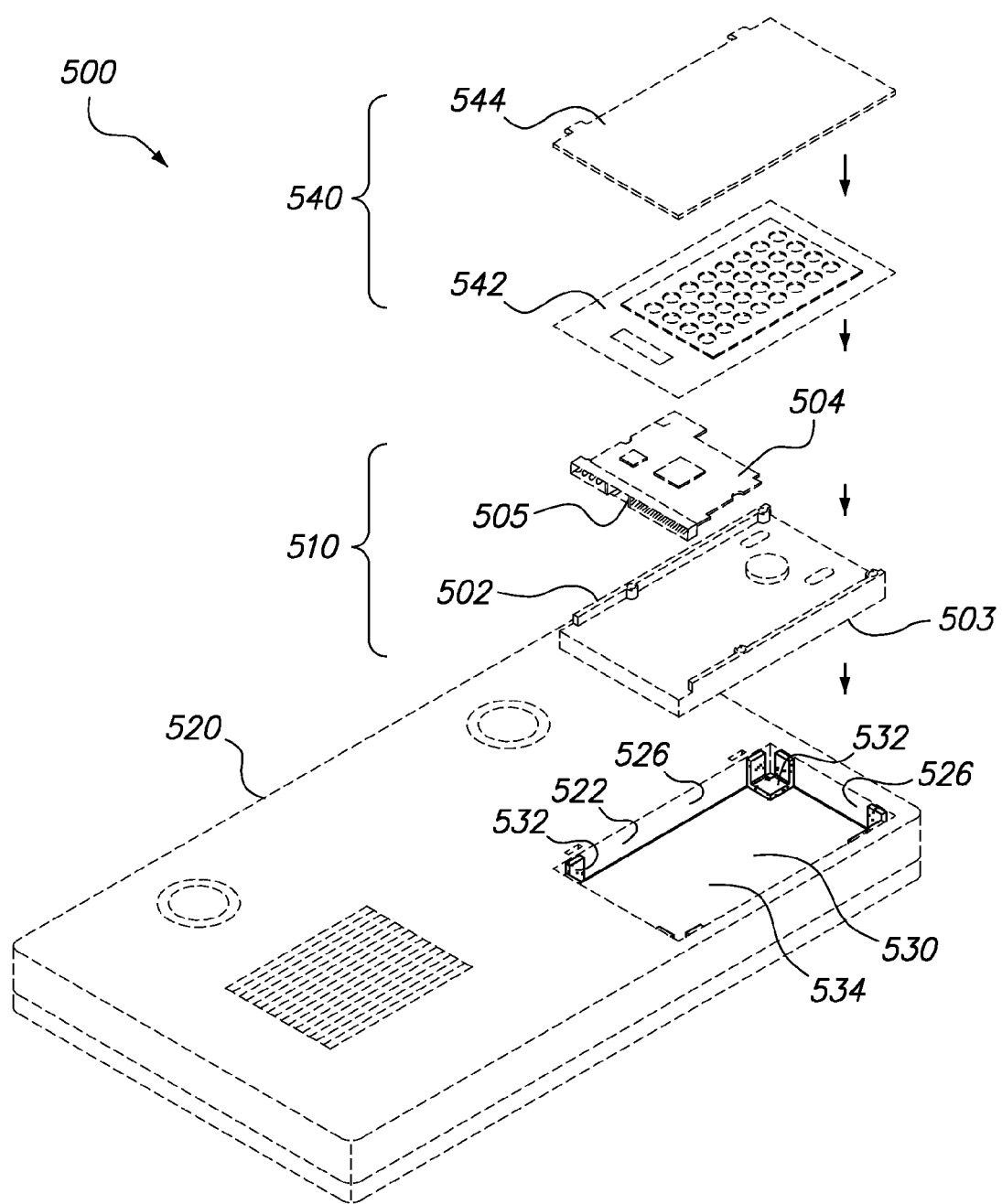
FIG. 5 is a bottom perspective exploded view of an information storage device according to another embodiment of the present invention.

FIG. 5 is a bottom perspective exploded view of an information storage device 500 according to another embodiment of the present invention. The information storage device 500 includes a disk drive 510 that has a head disk assembly (HDA) 502 and a printed circuit board assembly (PCBA) 504. The information storage device 500 also includes a device housing 520 that includes a generally rectangular bay 522 to accommodate the disk drive 510. The generally rectangular bay 522 includes a base portion and a plurality of side portions 526.

The information storage device 500 of FIG. 5 also includes a bay cover 540 that encloses the disk drive 510 within the generally rectangular bay 522, by attachment of the bay cover 540 to the device housing 520 of the information storage device 500. The bay cover 540 may optionally include an electrically conductive cover component 542 for electromagnetic noise shielding, and an aesthetic cover component 544 that may comprise a material that matches or enhances the general exterior appearance of the device housing 120 of the information storage device 500. For example, the aesthetic cover component 544 may be a portion of the bottom face of a laptop computer, or may alternatively be all or a portion of the keyboard of a laptop computer.

The information storage device 500 of FIG. 5 also includes a damping insert sheet 530 that is disposed between the disk drive 510 and the base portion of the generally rectangular bay 522 of the device housing 520. The damping insert sheet 530 may include a plurality of elastomeric cushions 532, and a spanning sheet 534. Each of the plurality of elastomeric cushions 532 is attached to the spanning sheet 534 and is thicker than the spanning sheet 534.

In the embodiment of FIG. 5, the HDA 502 includes a disk drive cover 503 that does not face the disk drive PCBA 504 after the PCBA 504 is attached to the HDA 502 during assembly. The disk drive PCBA 504 includes an electrical connector 505, and when the disk drive 510 is placed into the generally rectangular bay 522 of the device housing 520, the electrical connector 505 is attached to a mating electrical connector of the information storage device 500.

In the embodiment of FIG. 5, it can be seen that each of the plurality of elastomeric cushions 532 contacts, and is compressed between the generally rectangular bay 522 and the disk drive 510 after assembly. Specifically, in this embodiment the damping insert sheet 530 is disposed between the disk drive cover 503, and the base portion of the generally rectangular bay 522 of the device housing 520, with at least one of the plurality of elastomeric cushions 532 contacting the disk drive cover 503. Such contact with the plurality of elastomeric cushions 132 may enhance protection of the disk drive 510 from certain risks associated with mechanical shocks externally applied to the information storage device 500. In this embodiment, the disk drive PCBA 504 is adjacent and facing the electrically conductive cover component 542 of the bay cover 540, after assembly.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A method for manufacturing an information storage device, the method comprising:
    inserting a damping insert sheet into a generally rectangular bay formed in the information storage device, the generally rectangular bay defined by a base portion and a plurality of side portions, the damping insert sheet comprising a plurality of elastomeric cushions attached to a spanning sheet;
    bending each of the plurality of elastomeric cushions around edges of a disk drive to form first and second portions of each of the plurality of elastomeric cushions; and
    placing the disk drive, including a plurality of disk drive sides defining external disk drive corners, into the generally rectangular bay, with the first portions of the plurality of elastomeric cushions disposed between the disk drive and the base portion compressing the first portions using opposing first compressive forces directed from a first disk drive side of the plurality of disk drive sides and the base portion, and compressing the second portions of the plurality of elastomeric cushions disposed between the disk drive and the plurality of side portions using second opposing compressive forces directed from predetermined others of the plurality of disk drive sides and the plurality of side portions,
    wherein the predetermined others are disposed orthogonal to the first disk drive side.

2. The method of claim 1, further comprising attaching an electrical connector to a mating electrical connector of the information storage device, wherein the disk drive includes a head-disk assembly and a printed circuit board assembly (PCBA) attached to the head-disk assembly, wherein the PCBA includes the electrical connector.

3. The method of claim 2, wherein the head-disk assembly includes a disk drive cover that does not face the disk drive PCBA, and placing the disk drive into the generally rectangular bay results in the damping insert sheet being disposed between the disk drive cover and the base portion with at least one of the plurality of elastomeric cushions contacting the disk drive cover.

4. The method of claim 3, further comprising enclosing the disk drive within the generally rectangular bay by attachment of a bay cover to the information storage device, wherein the disk drive PCBA is adjacent to and facing the bay cover.

5. The method of claim 1, wherein the plurality of side portions meet to define a plurality of internal bay corners adjacent the base portion, and placing the disk drive into the generally rectangular bay includes compressing the plurality of elastomeric cushions between the generally rectangular bay and the disk drive adjacent a respective one of the internal bay corners.

6. The method of claim 1, wherein the spanning sheet comprises an electrically dissipative polymer material.

7. The method of claim 1, further comprising extending the second portions from the first portions to a distal side of the disk drive, wherein the distal side is disposed opposite to the first disk drive side.

8. The method of claim 1, wherein the placing of the disk drive includes separating the first disk drive side from the base portion by a combined thickness of the spanning sheet and one of the plurality of elastomeric cushions.

9. The method of claim 1, wherein the placing of the disk drive includes disposing the spanning sheet within a geometric plane.

10. The method of claim 1, wherein the placing of the disk drive further includes compressing each of the plurality of elastomeric cushions with three of the plurality of disk drive sides.

11. The method of claim 1, further comprising placing predetermined ones of the plurality of elastomeric cushions in contact with three of the plurality of disk drive sides, including the first disk drive side.

12. The method of claim 1, further comprising placing predetermined ones of the plurality of elastomeric cushions in contact with the base portion and two of the plurality of side portions.

13. The method of claim 1, wherein the plurality of elastomeric cushions are each thicker than the spanning sheet.

14. A method for manufacturing an information storage device, the method comprising:
    inserting a damping insert sheet into a bay formed in the information storage device, the bay defined by a base portion and a plurality of side portions of the device housing, the damping insert sheet comprising a plurality of elastomeric cushions and a spanning sheet, a first portion of each of the plurality of elastomeric cushions being attached to the spanning sheet; and
    placing a disk drive into the bay and compressing each of the plurality of elastomeric cushions with a first disk drive side of the disk drive and two of a plurality of second disk drive sides of the disk drive,
    wherein the plurality of second disk drive sides extends from a periphery of the first disk drive side, with first portions of the plurality of elastomeric cushions disposed between the first disk drive side and the base portion compressing the first portions using opposing first compressive forces directed from the first disk drive side and the base portion, and compressing second portions of the plurality of elastomeric cushions disposed between the plurality of second disk drive sides and the plurality of side portions using second compressive forces directed from the plurality of second disk drive sides and the plurality of side portions.

15. The method of claim 14, wherein the placing of the disk drive into the bay includes separating the first disk drive side from the base portion by a combined thickness of the spanning sheet and one of the plurality of elastomeric cushions.

16. The method of claim 14, further comprising extending the second portions from the first portions to a distal side of the disk drive, wherein the distal side is disposed opposite to the first disk drive side.

17. The method of claim 14, wherein the placing of the disk drive includes disposing the spanning sheet within a geometric plane.

18. A method for manufacturing an information storage device, the method comprising:
    inserting a damping insert sheet into a generally rectangular bay formed in the information storage device, the rectangular bay defined by a base portion and a plurality of side portions, the damping insert sheet comprising a plurality of elastomeric cushions attached to a spanning sheet which is disposed in a geometric plane, and the plurality of elastomeric cushions are each thicker than the spanning sheet;
    bending each of the plurality of elastomeric cushions orthogonally to form first and second portions thereof; and
    placing a disk drive, including a plurality of disk drive sides defining external disk drive corners, into the generally rectangular bay, with the first portions of the plurality of elastomeric cushions disposed between the disk drive and the base portion compressing the first portions using opposing first compressive forces directed from a first disk drive side of the plurality of disk drive sides and the base portion, and compressing the second portions of the plurality of elastomeric cushions disposed between the disk drive and the plurality of side portions using second opposing compressive forces directed from predetermined others of the plurality of disk drive sides and the plurality of side portions,
    wherein the predetermined others are disposed orthogonal to the first disk drive side.

* * * * *